J. CASHMER.
NUT AND BOLT LOCK.
APPLICATION FILED MAR. 9, 1921.
1,433,675. Patented Oct. 31, 1922.
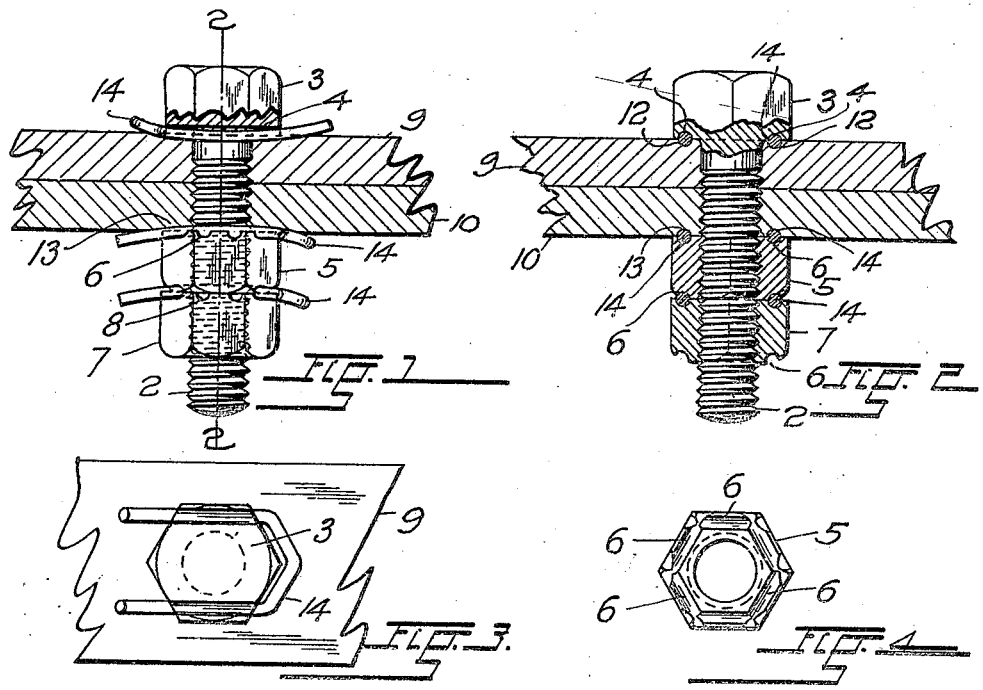
INVENTOR.
JACOB CASHMER.
BY
ATTORNEY.

Patented Oct. 31, 1922.

1,433,675

UNITED STATES PATENT OFFICE.

JACOB CASHMER, OF DENVER, COLORADO.

NUT AND BOLT LOCK.

Application filed March 9, 1921. Serial No. 450,956.

*To all whom it may concern:*

Be it known that I, JACOB CASHMER, a citizen of the United States, residing at Denver, in the county of Denver and State of Colorado, have invented certain new and useful Improvements in Nut and Bolt Locks, of which the following is a specification.

This invention relates to nut and bolt locks and its main object is to provide a device of simple construction which securely locks the nut upon its bolt by cooperation with an object which it engages.

Another object is to provide a locking means which is applicable to different kinds of bolts for the purpose of holding them against rotation, and still another object of the invention is to provide a locking device which is readily removed to permit of unscrewing a nut which was fastened thereby and which is as readily replaced after the nut has been returned to its original position.

Other objects of my invention will fully appear in the course of the following description in which reference is had to the accompanying drawings which illustrate different applications of my invention, and in which similar characters of reference designate corresponding parts throughout the several views.

In the drawings, Figure 1 represents a sectional elevation showing my improved nut lock applied to the head of a bolt and to a principal nut and a jam nut screwed upon the threaded part thereof;

Figure 2, a section taken on the line 2—2, Figure 1;

Figure 3, a top view of the construction shown in Figure 1; and

Figure 4, a bottom view of one of the nuts.

The application of my nut lock requires grooving of the contacting faces of the nut or bolt head and the object with which it engages. The grooved nut or bolt head extends rectilinearly between opposite points in the perimetric surface thereof and on square or hexagon nuts or bolt-heads they are substantially parallel to their sides.

The washer or other object with which the nut or bolt-head engages is likewise grooved so that the corresponding grooves in the two surfaces of the contacting parts when brought in register with each other will conjointly form ways for the reception of a key by which the parts are locked against independent rotation.

It is desirable to provide the nut or bolt head with as many grooves as can be conveniently formed in its bottom surface so that one of them is readily brought in register with a corresponding groove of the object with which the nut or head engages and by arranging the grooves in the opposed surfaces parallelly in pairs, a U-shaped key may be employed to lock the parts together.

Referring to the drawings, 2 designates a machine bolt the head 3 of which has grooves 4 formed and arranged as hereinbefore described.

A principal nut 5 has grooves 6 in its opposite surfaces and a jam nut 7 has correspondingly arranged grooves 8 in its under surface only.

The machine parts 9 and 10 to which the bolt is applied have pairs of grooves 12 and 13 in their outer surfaces which correspond in relative position and size with the pairs of grooves in the bolt heads and the nut 5 to register therewith when the latter are brought in contact with the parts.

When the bolt is inserted through the alined holes of the machine parts it is turned until a pair of the grooves on the under side of its head are in register with the pair of grooves in the surface of the part with which the head engages after which a U-shaped key 14 is inserted in the openings formed by the grooves.

The parallel prongs of the keys correspond in form and diameter with the openings formed by the grooves, and they are preferably curved as shown in the drawings to prevent their displacement by frictional contact with the parts.

After the bolt has thus been secured against rotation, the two nuts 5 and 7 are screwed home and similar keys are placed in the openings formed by the alined grooves in the engaging surfaces of the two nuts and in the registering grooves of the principal nut and the machine part with which it engages.

Having thus described my improved nut and bolt lock, it will be understood that single keys may be employed in the place of the U-shaped keys shown in the drawings, that the grooves in the nuts and bolt heads and the prongs of the keys are not necessarily round as shown in the drawings, but may be made of any suitable cross-sectional form, and that other variations in the form and construction of the parts may be resorted to without departing from the spirit and scope of my invention.

What I claim and desire to secure by Letters-Patent is:

1. A nut and bolt lock comprising in combination, a bolt, a nut thereon, having a straight groove in its underside, an object with which the nut engages, having a corresponding groove, and a longitudinally curved key fitted in the opening formed by the grooves when brought in register with each other.

2. A nut and bolt lock comprising in combination, a bolt, a nut thereon, having a pair of non-radial grooves in its underside, an object with which the nut engages, having a corresponding pair of grooves, and a U-shaped key having its members extending longitudinally in the openings formed by the pairs of grooves when brought in register with each other.

3. A nut and bolt lock comprising in combination, a bolt having a pair of non-radial grooves in the under side of its head, an object with which the head engages, having a corresponding pair of grooves, and a U-shaped key, having its members extending longitudinally in the pairs of grooves when brought in register with each other.

In testimony whereof I have affixed my signature.

JACOB CASHMER.